UNITED STATES PATENT OFFICE.

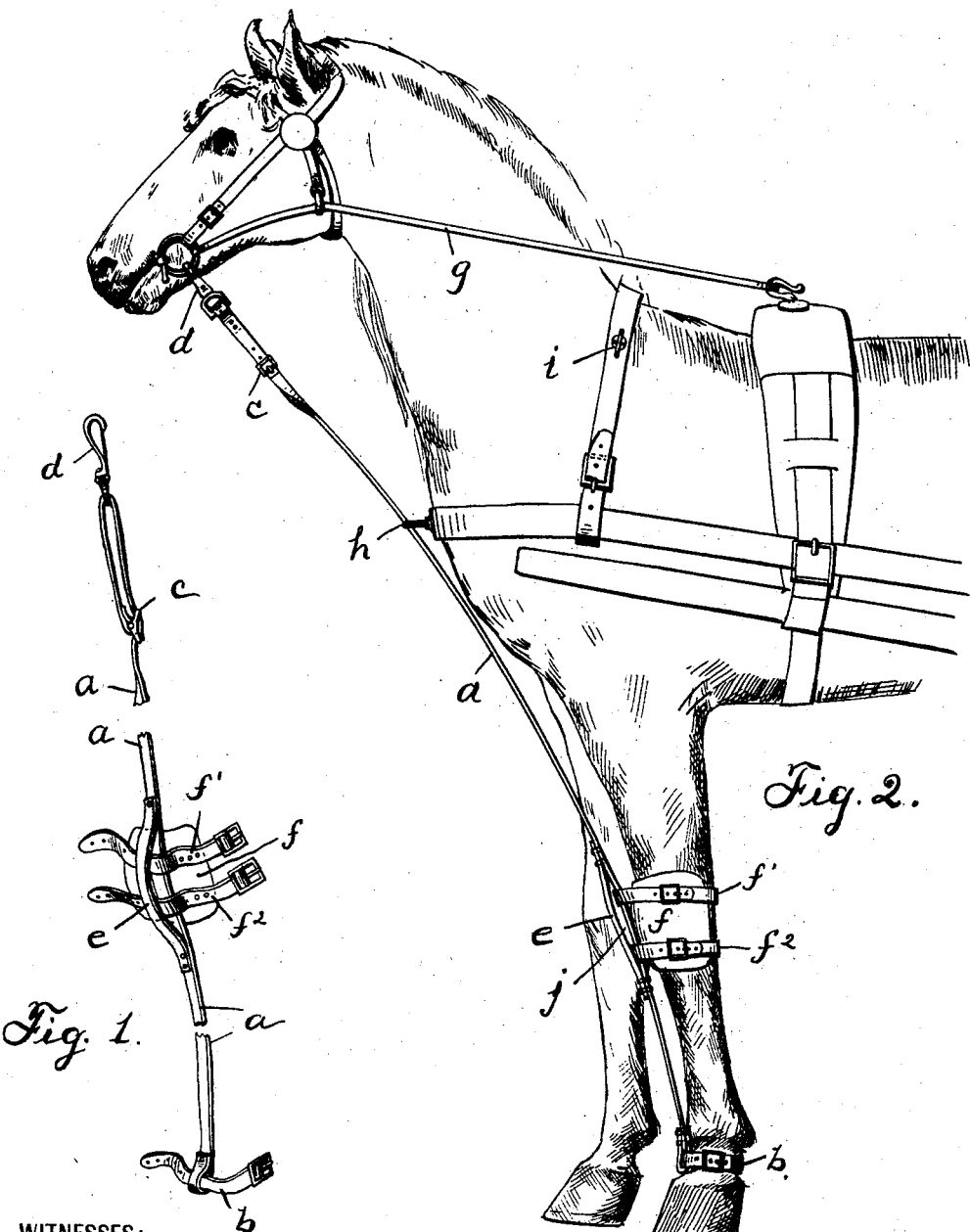

WILLIAM L. MORRISSEY, OF SUMMIT, NEW JERSEY.

HORSE-HOPPLE.

SPECIFICATION forming part of Letters Patent No. 708,063, dated September 2, 1902.

Application filed June 1, 1901. Serial No. 62,751. (No model.)

*To all whom it may concern:*

Be it known that I, WILLIAM L. MORRISSEY, a citizen of the United States, residing at Summit, in the county of Union and State of New Jersey, have invented certain new and useful Improvements in Horse Hopples or Holding Devices; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide means for preventing a horse when harnessed to a carriage or delivery-wagon from running away while the driver leaves the vehicle; to thus obviate the necessity for tying the horse to a hitching-post or for handling a heavy weight, such as is commonly used; to provide an attachment which shall permit the horse to assume a natural position so long as he stands still, but which will draw forcibly upon the bit as soon as he attempts to walk; to provide such a device which can be simply unhooked from the bit when it is desired to drive on and caught into another part of the harness, thus remaining always in position upon the horse; to secure a cheap and simple construction and one which will be comfortable to the animal, and to secure other advantages and results, some of which may be referred to hereinafter in connection with the description of the working parts.

The invention consists in the improved horse hopple or holder and in the arrangements and combinations of parts of the same, all substantially as will be hereinafter set forth and finally embraced in the clauses of the claim.

Referring to the accompanying drawings, in which like letters of reference indicate corresponding parts in each of the several figures, Figure 1 is a perspective view of my improved device, and Fig. 2 shows the same in use upon a horse.

In said drawings, $a$ indicates a long strap of leather or other suitable material adapted to extend from the ankle of one of the front legs of a horse up to the bit at his mouth, and to the lower end of said strap is fastened in any suitable manner a band $b$, adapted to buckle around the ankle of the horse between the hoof and fetlock, as shown in Fig. 2. The upper end of the strap is passed through a snap-hook $d$ and attached to itself back from said snap-hook by means of a buckle $c$, adapted to adjustably slide upon the strap and which permits the length of the strap to be varied to suit the animal on which the device is to be used. The snap-hook $d$ is of any usual and suitable construction adapted to be snapped into the ring at one end of the bit.

Near the lower end of the strap $a$ or end having the band $b$ a strip $e$ is fastened longitudinally upon the said strap by its opposite ends, so as to form a loop $j$. Through said loop or space $j'$, thus formed between the strap $a$ and strip $e$, are loosely passed the bands $f'$ $f^2$ of a knee cap or cushion $f$, adapted to be secured to the horse's leg. Said cushion is strapped against the front of the animal's knee by means of the two bands $f'$ $f^2$ described, one of which lies above and the other below the bulge of the knee, the connection of said bands with the loop $j$ remaining loose, so as to permit a free sliding of the strap $a$.

It will be understood that my improved device is more especially intended for use upon harnessed horses, for the drivers of delivery-wagons, and the like, who make frequent stops and have to leave the horse and wagon without a driver. In such cases the horse has been tied to a post or a heavy weight lifted from the wagon and attached to his bit, so as to insure that he will not run off. By my invention, however, under such conditions the hopple being applied to the horse's leg, as described, its upper end is snapped into the bit, as shown in Fig. 2. The animal is then free to stand in an easy and natural position; but as soon as he carries his free foot forward to step or bend the knee of his hoppled leg he produces a draft upon the strap $a$, which is transmitted to the bit and stops him. It will be understood that the horse's head is held up by means of a check-rein $g$ of any usual kind, so that he cannot obtain freedom for movement by lowering his head. The strap $a$ is preferably carried through a ring $h$ on the breast-plate intermediate of the horse's knee and head, and when unsnapped or detached from the bit the upper end of the strap is caught into a ring $i$ on any suitable or convenient part of the harness, so as to prevent the device from falling to the ground or interfering with the motion of the horse.

The device thus described is very simply and cheaply manufactured, and can be effectively used by drivers of delivery-wagons and the like, to a great saving of time and labor. Moreover, it can be made of light material, so as to present a pleasing appearance and be comfortable to the horse, since with most animals a slight pull on the bit serves as a sufficient reminder to stop.

Having thus described the invention, what I claim as new is—

1. The herein-described horse hopple or holder, comprising a strap adjustable in length and adapted at one end to be fastened to the horse's bit, means at the other end of said strap for fastening it to the ankle, between the fetlock and hoof, of one of the horse's fore feet, and a knee cap or cushion slidably secured to the strap intermediate of its ends and adapted to buckle firmly to the knee of the same leg to which the strap is fastened.

2. In a horse hopple or holder, a strap $a$, adapted at one end to be attached to the bit and at the other end to be buckled around the ankle, between the fetlock and hoof, of one of the horse's fore feet, and a knee cap or cushion adapted to be strapped firmly to the knee of the same leg to which the strap is buckled and having loops through which said strap passes.

3. The combination of the strap $a$, a band $b$, for the ankle of a horse's fore leg at one end of said strap, a snap-hook $d$, for the bit adjustably secured to the other end, a strip $e$, secured at its ends to said strap intermediate of said band and snap-hook and forming a loop $j$, a cap or cushion $f$, for the knee of the said fore leg, and fastening-bands $f'$, $f^2$, for said cap or cushion passing loosely through the loop $j$, whereby the strap may slide with respect to said cap or cushion when the latter is fixed by its bands.

In testimony that I claim the foregoing I have hereunto set my hand this 31st day of May, 1901.

WILLIAM L. MORRISSEY.

Witnesses:
CHARLES H. PELL,
C. B. PITNEY.